United States Patent
Keller, Sr.

(10) Patent No.: US 7,442,357 B2
(45) Date of Patent: Oct. 28, 2008

(54) MANUFACTURE OF SILICA AEROGEL VIA VAPOR PHASE REACTION

(75) Inventor: Robert R. Keller, Sr., Bedford, NH (US)

(73) Assignee: Keller Companies, Inc., Manchester, NH (US)

( * ) Notice: Subject to any disclaimer, the term of this patent is extended or adjusted under 35 U.S.C. 154(b) by 80 days.

(21) Appl. No.: 11/709,402

(22) Filed: Feb. 22, 2007

(65) Prior Publication Data

US 2008/0206122 A1 Aug. 28, 2008

(51) Int. Cl.
- C01B 33/12 (2006.01)
- C01B 33/16 (2006.01)
- B01J 12/00 (2006.01)
- B82B 3/00 (2006.01)

(52) U.S. Cl. ............... 423/335; 423/336; 423/338; 977/840; 977/895; 977/896

(58) Field of Classification Search .............. 423/335, 423/336, 338; 977/840, 895, 896
See application file for complete search history.

(56) References Cited

U.S. PATENT DOCUMENTS

| | | | |
|---|---|---|---|
| 3,872,217 A | 3/1975 | Merz et al. | |
| 5,746,992 A * | 5/1998 | Yoldas et al. | 423/338 |
| 5,879,744 A | 3/1999 | Cao et al. | |
| 6,068,882 A | 5/2000 | Ryu | |
| 6,764,667 B1 * | 7/2004 | Steiner, III | 423/338 |
| 2004/0132846 A1 | 7/2004 | Leventis et al. | |
| 2006/0084707 A1 | 4/2006 | Ou et al. | |
| 2007/0152363 A1 * | 7/2007 | Begag et al. | 264/41 |

* cited by examiner

Primary Examiner—Timothy C Vanoy
Assistant Examiner—Serena L Hanor
(74) Attorney, Agent, or Firm—Davis Bujold & Daniels, P.L.L.C.

(57) ABSTRACT

A kinetically controlled vapor reaction process for synthesizing silica areogel in a reaction container by injection of a precursor reagent vapor, a catalyst reagent vapor, super saturated steam as a component of the catalyst solution, and a hydrophobic reagent vapor amd continuously mixing vapor droplets of the precursor, catalyst and water reagents in a super saturated state to continuously nucleate in a hydrolysis/poly-condensation reaction and deposit as silica aerogel.

23 Claims, 4 Drawing Sheets

Traces A1, A2, and A5 are those of three batches of VaporGel, Synthesized by gas phase reaction. Traces A3, and A4 are those for two batches of liquid phase Kalgel-1105

Silica Nanogel particle formation

IR BOND STRETCHES FOR SAMPLES A1 THROUGH A5    FIG. 3

| Wave number, cm$^{-1}$ | Chemical Bond, [Yoda 1999], [Hüsing 1997], Orcel 1986] |
|---|---|
| 3500-3400 | Absorbed molecular water |
| 3750 | Free Si-OH on the surface of the gel |
| 3665, 3540 | Silanol groups linked to molecular water through hydrogen bonds, internal Si-OH |
| 2958 | Si-O-CH$_3$ symmetric stretching, C-H stretching |
| 2856 | C-H second stretching (methanol and unhydrolized TMOS) |
| 1868, 806 | (Si-O-Si): vibration of SiO$_2$ network |
| 1655 | H-O-H, absorbed molecular water |
| 1456, 1412 | C-H, ≡ Si-O-CH$_3$ (unhydrolized TMOS) |
| 1090 | ≡ Si-O, vibration of silica network |
| 806 | Si-O-Si vibrational mode |
| 948, 460 | Si-O-Si deformation |

UV-VIS Spectrum for hydrophobic VaporGel batch versus hydrophilic Kalgel batch

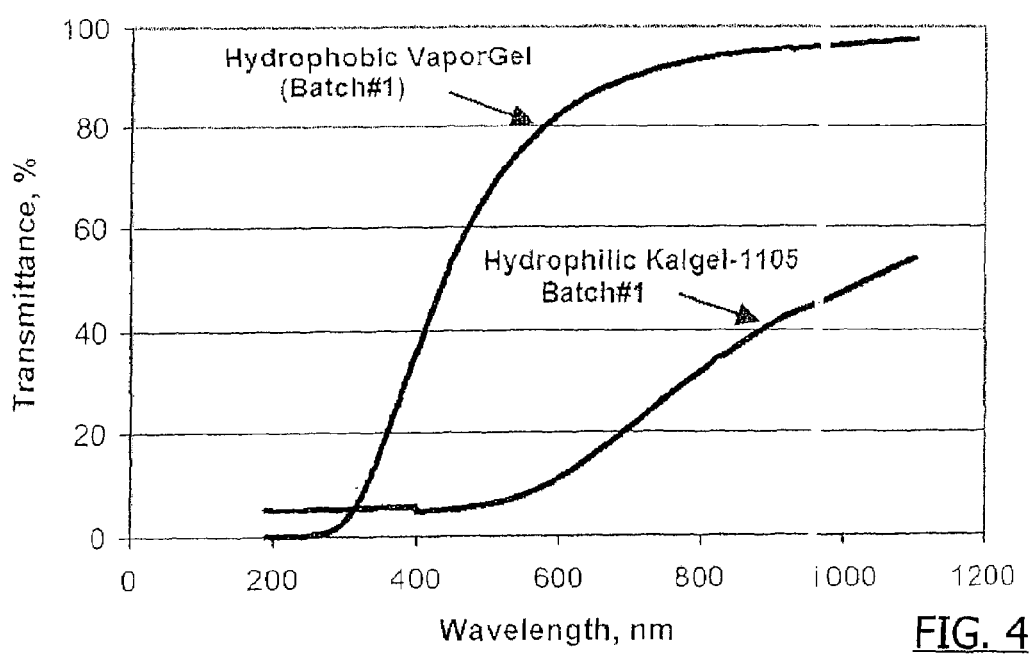

FIG. 4

MANUFACTURE OF SILICA AEROGEL VIA VAPOR PHASE REACTION

FIELD OF THE INVENTION

The present invention is directed to an improved method for continuously preparing silica aerogel products, such as granules, coatings, composites or monoliths, in which the byproduct of the reaction is a dry silica aerogel and, in particular, to a method for the production of silica aerogel by a kinetically controlled vapor reaction process in a Constant-Temperature Stirred Tube Reactor (CSTR) or a Plug Flow Reactor (PFR) to significantly reduce batch cycle times.

BACKGROUND OF THE INVENTION

Aerogels are chemically inert, highly porous ceramic materials that have many applications. For example, aerogels may be used as high transparency insulator structural panels; as face sheets for light transmitting panels and light boxes, as a growth media for algae colonies, as an encapsulant for a controlled-drug release; as synthetic bone(s), synthetic cartilage(s) and synthetic teeth, as a liquid fuel reservoir(s), as an encapsulant(s) of a fire retardant or dye, as a high performance protective coating(s), as an acoustic barrier(s), and so on.

There are, however, a number of major problems with existing batch processes methods for manufacturing aerogels, such as the times required to complete the batch manufacturing process. For example, a typical aerogel manufacturing process begins with an initial sol-gel self-assembly step lasting anywhere from several minutes to several hours or so in which a precursor liquid and a catalyst liquid are combined in a liquid/liquid phase reaction to form a porous structure wherein the pores of the structure are filled with a solvent. This step is followed by processes requiring up to 150-200 hours or so in which the solvent is extracted from the porous structure by an exhaustive solvent removal process, without damaging the porous structure, and thereafter the porous solid structure is finally annealed, or cured, to achieve the desired physical properties of the aerogel.

The present invention provides a method for the production of aerogels that addresses and provides solutions for the above and other associated problems of the prior art manufacturing processes.

SUMMARY OF THE INVENTION

As will be described in the following detailed description of the invention, the present invention provides a method for the synthesis of aerogel products with process cycle times as low as 8 hours to complete manufacture of a dry, final aerogel product.

During this process, a precursor alkoxide-ethanol solution consisting of a 1-to-20 ratio of the alkoxide (preferably Silbond H-40 and Silbond H-5, tetraethoxysilane (TEOS) and TMOS or a blend thereof) is heated to a temperature of approximately 160° F. and is introduced into the reaction chamber of a Plug Flow Reactor (PFR) or a Constant-Temperature Stirred Tank Reactor (CSTR), for example, by being "aerosoled" or sprayed through a sub-micon nozzle at relatively high pressure.

The atomized alkoxide-ethanol droplet mixture is maintained in the reactor at temperature of about 160° F. and follows a path of least resistance through the negative pressure reaction chamber. As the atomized aerosol droplets flow through the reaction chamber, they are forced through a primary filter which is saturated with a catalyst, and then through a secondary stage final filter which is saturated with steam (water).

It must be noted that according to the process of the present invention, the characteristics of the final product are determined by a stoichiometric molar ratio and that the presence of water at stoichiometric concentrations in the hydrolysis/poly-condensation reaction results in inhibition of condensation and determines the characteristics of the product. In the CSTR, and in order to accomplish the desired process, the three components of the hydrolysis/poly-condensation reaction, that is, the alkoxide-ethanol mixture and the water, are brought together in aerosol droplet form by the introduction of steam into the chamber at or before the secondary stage final filter. The introduction of steam causes a hydrolysis-polycondensation reaction to occur at an increased rate of speed, e.g., on the order of—milliseconds or microseconds, and a high steam (water) content serves to enhance transport of the catalyst into the reaction zone, which is dependent on a laminar flow stream configuration. During the reaction, supersaturated steam provides the impetus for the reaction kinetics to occur more rapidly and, therefore, serves as a conduit for allowing the reacting components to react with one another. As a result this, the level of steam content in the CSTR produces two different structures of silica aerogel:

1) a very low-density, high clarity aerogel, and
2) a low density, super high clarity aerogel.

A vacuum pump maintains turbulent flow (e.g., a Reynolds Number of between about 4000-7000) within the chamber. At the stage when silica gel begins to form (measured via vibratory screen sensors) within the chamber, a HMDZ aerosol is introduced and flows into the travel path of the reactants. As silica gel begins to form within the chamber, the silica gel starts to cool, gains weight and eventually collects upon a vibratory screen supported by a base region of the chamber. The overall process for producing silica gel in a kinetically controlled reaction chamber lasts on the order of a few milliseconds to few minutes or so.

As a result of the present invention, the overall process time to produce silica gel in a kinetically controlled reaction chamber is on the order of milliseconds to minutes and the process provides a yield rate of approximately 92%. In addition, and because the residence time $t_R$ in the processes is markedly shorter—milliseconds to minutes—the final gel has already attained its full self-assembly stage by the end of the process and, as a result, an annealing (thermal reinforcement) process is no longer required.

In summary, therefore, the present invention is directed to a kinetically controlled vapor reaction process for synthesizing silica areogel. The process is performed in a reaction container and includes the steps of (a) continuously injecting a precursor reagent vapor including an ethanol and an alkoxide at an initial precursor reagent temperature between 90° F. and 185° F. and at an initial precursor reagent pressure of 20 to 120 psig, (b) continuously injecting a catalyst reagent vapor of ethanol/ammonium hydroxide at an initial catalyst reagent temperature between 90° F. and 185° F. and at an initial catalyst reagent pressure of 20 to 120 psig, (c) continuously injecting super saturated steam as a component of the catalyst solution, (d) continuously injecting a hydrophobic reagent vapor at an initial hydrophobic reagent temperature between 90° F. and 185° F. and at an initial hydrophobic reagent pressure of 20 to 120 psig, and (e) continuously mixing vapor droplets of the precursor, catalyst and water reagents in a super saturated state and under turbulent flow conditions in the reaction container, whereby the precursor, the catalyst and the water reagents continuously nucleate in a hydrolysis/poly-condensation reaction and deposit as silica aerogel.

In presently preferred embodiments of the process the various reagents into the reaction container are preferably injected into the reaction container at preferred temperatures and pressures. For example:

(A) the step of injecting the precursor reagent at a temperature of between 100° F. and 140° F. and at a pressure of between 40 to 90 psig.

(B) the step of injecting the precursor reagent at a temperature of between 100° F. and 140° F. and at a pressure of between 60 to 80 psig.

(C) the step of injecting the catalyst reagent at a temperature of between 100° F. and 155° F. and at a pressure of between 40 and 90 psig.

(D) the step of injecting the catalyst reagent at a temperature of between 110° F. and 140° F. and at a pressure of between 60 and 80 psig.

(E) the step of injecting the hydrophobic reagent at a temperature of between 100° F. and 175° F. and at a pressure of between 40 and 90 psig.

(F) the step of injecting the hydrophobic reagent at a temperature of between 130° F. and 160° F. and at a pressure of between 60 and 80 psig.

(G) the step of maintaining an internal temperature of the reaction container at a temperature between 90° F. and 185° F. and at a negative internal pressure of between about 5 to about 28 psig.

In other aspects of the invention the reaction container is maintained at an internal temperature of between 110° F. and 160° F. and preferably between 130° F. and 140° F., or at an internal temperature of between 110° F. and 160° F. and at a negative internal pressure between 10 and 25 psig or at a negative internal pressure between 15 and 20 psig.

The process further preferably uses at least one of Silbond H-5, H-40, H-30, H-35, tetraethoxysilane and tetramethylorthosilicate as the alkoxide and at least one of ammonium hydroxide/200 proof USP grade ethanol gamma-APTES/200 proof USP grade ethanol as the catalyst.

The precursor reagent is preferably injected via a turbo pump and a jet nozzle at a location where a vapor flow stream commences flow through the reaction container, the catalyst reagent vapor is preferably injected via a turbo pump and a jet nozzle and into a catalyst filter located in a vapor flow stream through the reaction container after an injection point of the precursor reagent vapor, and the water is preferably injected through a turbo pump and a jet nozzle and into a secondary filter located in a vapor flow stream through the reaction container after injection point of the precursor reagent vapor and the catalyst reagent vapor.

BRIEF DESCRIPTION OF THE DRAWINGS

The invention will now be described with reference to the drawings in which:

FIG. 3 shows IR Bond Stretches for a variety of samples, e.g., A1-A5;

FIG. 4 is a graph diagrammatically showing the transmittance versus wavelength for a hydrophobic vaporgel versus a hydrophilic vaporgel (e.g., Kalgel®);

DETAILED DESCRIPTION OF THE INVENTION

Figure 1A:
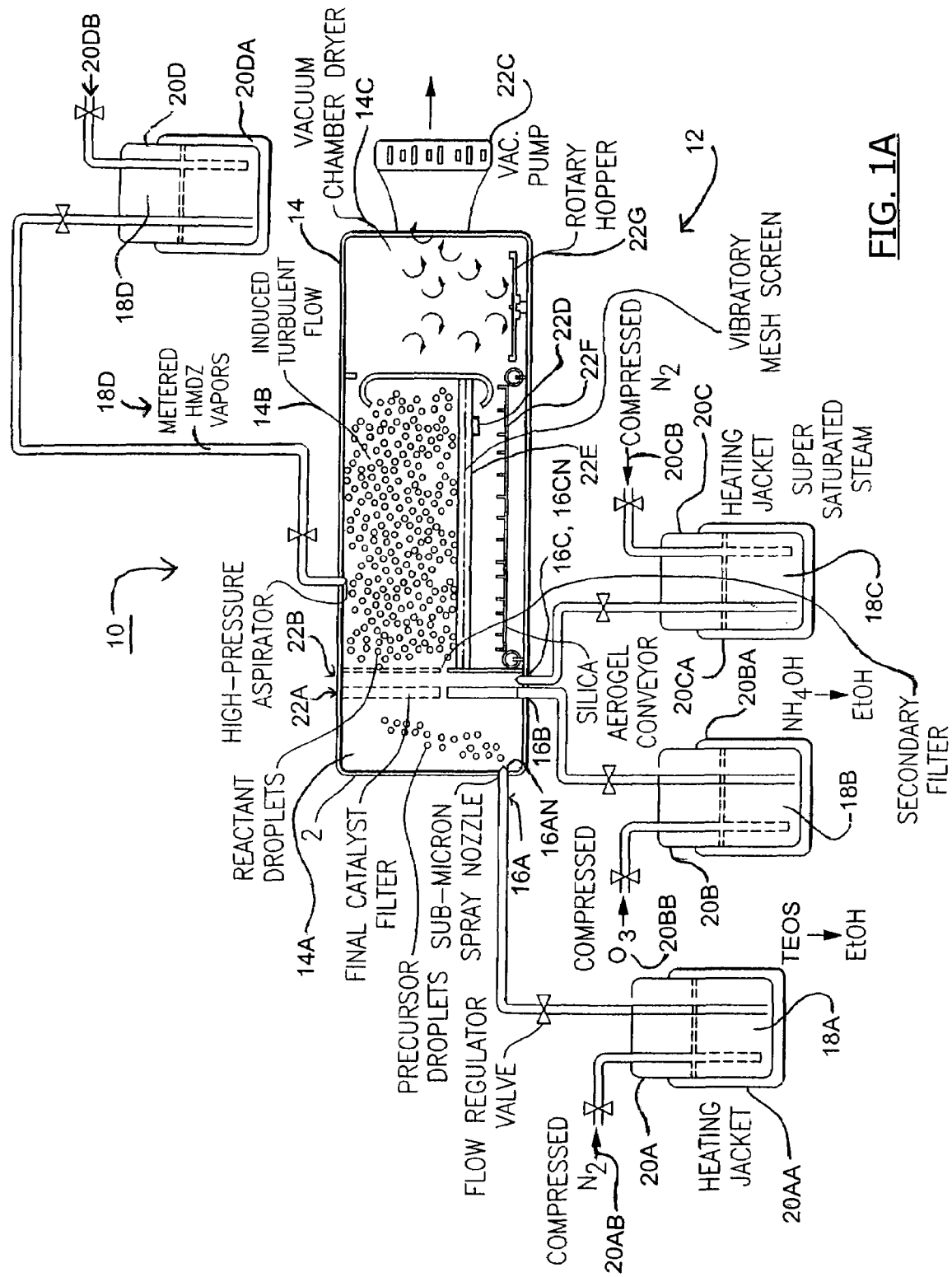
FIG. 1A is a diagrammatic drawing showing equipment suitable for practicing the present invention.
Figure 2:
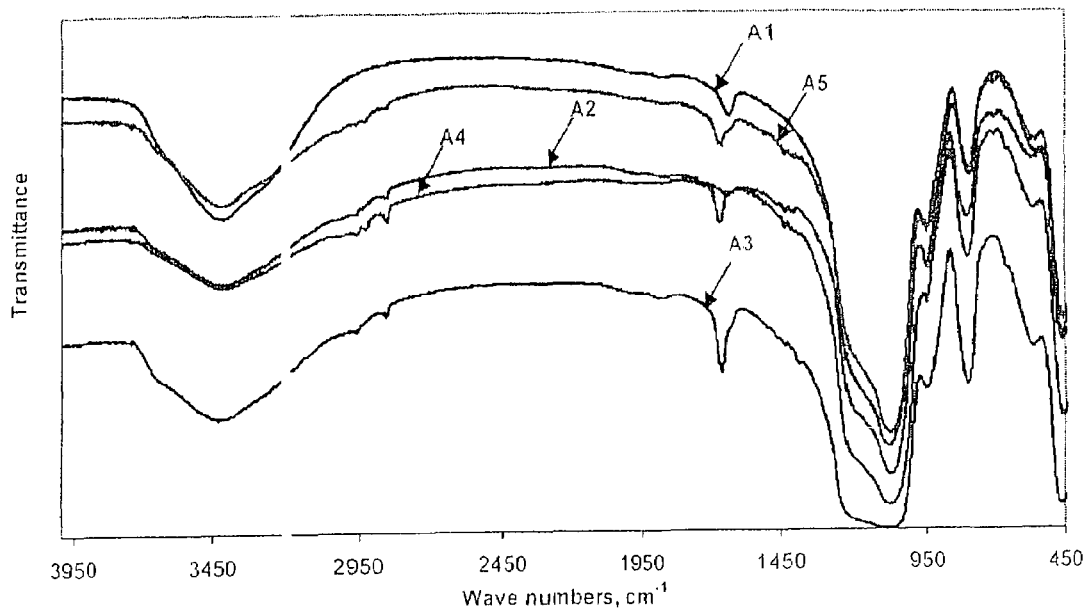
FIG. 2 shows the transmittance versus wave number for three batches of vapor gel.

Referring to FIG. 1A, the method of the present invention is a continuous, vapor phase process for the production of super high quality silica aerogel. The method of the present invention may be implemented, for example, in a Constant-Temperature Stirred Tank Reactor (CSTR) or in a Plug Flow Reactor (PFR), both of which are well known in the relevant art.

Briefly, a stirred tank reactor essentially comprises a tank wherein one or more fluid reagents are continuously introduced into one end of the reactor and are continuously mixed and reacted to form the reaction products, with the end reaction product or effluent being removed from the opposite end of the tube or tank during the process. In a CSTR, the mixing of the reagents and the density or concentrations of the reagent reactions are generally relatively uniform throughout the volume of the tank and the residence time of a process is the average amount of time a discrete quantity of reagent spends inside the tank which is determined simply by dividing the volume of the tank by the average volumetric flow rate through the tank.

A PFR essentially comprises a pipe or tube without a mixing mechanism so that the flow of reagents and product through the pipe or tube is modeled as a continuous succession of "plugs" of liquids in which each "plug" is a volume of reacting reagents and reaction products. There is relatively little mixing of reagents and reaction products between "plugs", so that each "plug" may be effectively regarded as a miniature reaction tank. As a result, the average reagent concentration and the reaction rate, through a PFR, are the averages of the reagent concentration and reaction rate within the successive plugs and thereby form a gradient. In particular, the average reagent concentrations and reaction rates will be higher at the inlet end of the tube and will decrease along the length of the tube while the concentration of reaction products will form a gradient that is lowest at the inlet port and highest at the outlet port.

In summary, the process of the present invention, as will be described in detail in the following, is a kinetically controlled vapor reaction process for synthesizing silica aerogel. A reaction is carried out in a CSTR or in a PFR and reactant droplets are introduced into the reactor by a negative reactor chamber pressure or by a forced aspirator-type nozzle, respectively. In both cases, reactants form aerosol-type droplets, the size of which are controlled by way of sub-micron and micron size jet nozzles. The evaporate droplet concentrations reaches the super saturated state and droplets begin to nucleate, coalesce and free-fall within the reaction chamber. During free-fall, residual solvent is lost and porous networks begin to generate.

The precursor solution (alkoxide/EtOH) mixture is evaporated or vaporized (aerosoled) and introduced via high pressure turbo pump through a jet nozzle into the mixing zone or chamber. The jet nozzle, in combination with a negative internal reactor Delta Pressure ($\Delta P$), creates a turbulent transition zone having a Reynolds Number $R_e$ in the range of 2000-4000. The reaction impetus is generated and maintained by way of thermo hydrodynamic actions and fueled by the sequential supply or injection of various reactants and hydrolysis/poly-condensation reactions occur simultaneously with aerosol droplets forming sol-gel droplets instantly and undergoing free-fall to the solid silica aerogel state. The instantaneous aerosol droplet condensation reaction coupled with the negative pressure differential alleviates pore collapse, upon drying, and silica aerogel produced in the process differs structurally since the aerogel contains both mesopores and nanopores wherein the mesopores control and provide a large surface area. Byproducts are removed from the reactor chamber in a continuous and rapid manner, coincident with condensation of the precursor streams into fine aerosol droplets.

The CSTR is equipped with logic controllers which permit real time control and manipulation of sol-gel structure, its chemical composition, its crystal properties and its surface area. This is carried out through precise variation and control of process parameters. In the CSTR, the effects of reactor geometry reactant, reaction parameters and reactants concentration affect the final density, the overall transparency and yield of the aerogel product.

Figure 1B:
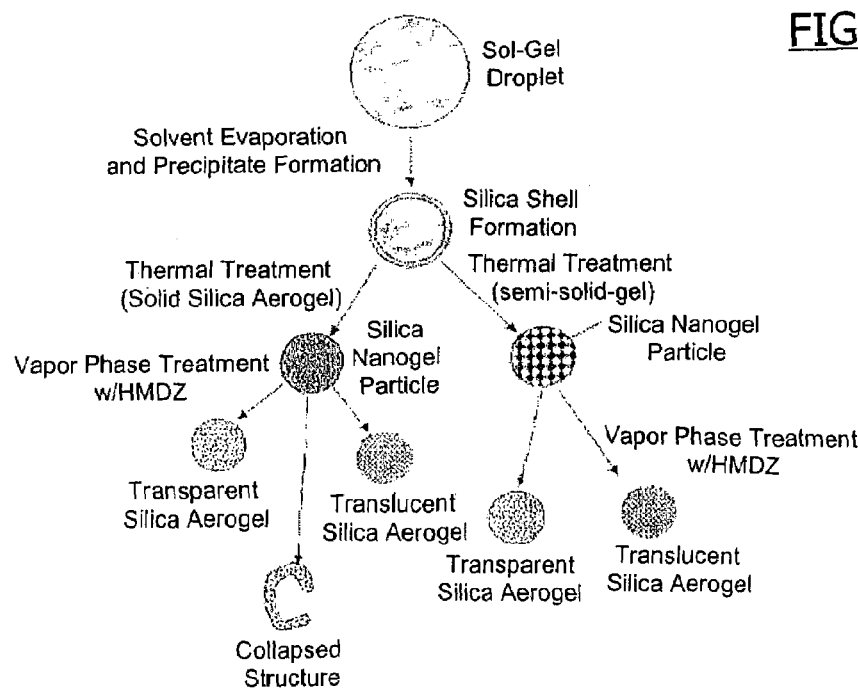
FIG. 1B shows the silica nanogel particle formation.

An exemplary embodiment of the method, according to the present invention, will be described and discussed in the following descriptions as implemented in a Constant-Temperature Stirred Tank Reactor (CSTR) 10, as illustrated in FIGS. 1A and 1B, and the adaptation of the present process to a Plug Flow Reactor (PFR) will be understood by those of ordinary skill in the relevant art.

FIG. 1A diagrammatically shows a CSTR 10 for implementing the present invention while FIG. 1B diagrammatically illustrates the processes carried out in the CSTR 10. As shown, the CSTR 10 includes a tank assembly 12 which has a reaction container 14, a number of inlet ports 16 for receiving the reagents 18 from various reagent sources 20, and a number of flow/reaction/collection elements 22 for controlling the flow and the collection of the reagents and the resulting reaction end product, that is, the aerogel.

As will be described in detail in the following description, the reagents 18 include a precursor reagent 18A, a catalyst reagent 18B, water 18C in the form of super saturated steam, and a hydrophobic reagent 18D.

Precursor reagent 18A comprises, for example, a 1 to 20 ratio mixture of an ethanol and an alkoxide wherein the alkoxide may be any one or more of Silbond H-5, H-40, H-30 and H-35, preferably Silbond H-40 and/or Silbond H-5, or TEOS (tetraethoxysilane) or TMOS (tetramethylorthosilicate) or a mixture thereof, is preheated to a temperature of approximately 160° F. in a precursor reagent tank 20A, which includes a heating jacket 20AA, and is pressurized with a pressurization gas 20AB, such as dry nitrogen, at a pressure in the range of about 20-120 psig, preferably in the range of about 40-90 psig and more preferably in the range of about 60-80 psig. Precursor reagent 18A is then supplied to the reaction container 14 via a sub-micron nozzle 16AN located at a precursor reagent input port 16A so that the precursor reagent 18A enters reaction container 14 as atomized aerosol droplets of the precursor reagent.

Catalyst reagent 18B is preheated to a temperature between approximately 90° F. to 185° F., and preferably to a temperature between approximately 110° F. to 140° F., in a catalyst reagent tank 20B that includes a heating jacket 20BA and is pressurized to a pressure of approximately 20-120 psig and preferably pressurized to a pressure of approximately 40-90 psig and more preferably pressurized to a pressure of approximately 60-80 psig by a pressurization gas 20BB. The catalyst reagent 18B may comprise, for example, an ethanol/ammonium, such as hydroxide ammonium hydroxide/200 proof USP grade ethanol or gamma-APTES/200 proof USP grade ethanol, and pressurization gas 20BB may comprise, for example, ozone ($O_3$)13. In an alternate embodiment, the catalyst reagent 18B may comprise ammonia generated by bubbling nitrogen ($N_2$) through a hot concentrated aqueous solution of ammonium hydroxide (29%), with the nitrogen also serving as the pressurization gas 22BB. As shown in FIG. 1A, catalyst reagent 18B enters reagent tank 14 through catalyst input port 16B and passed through a (primary) catalyst filter 22A to facilitate saturation of catalyst filter 22A.

Water 18C in the form of super saturated steam—which is essentially a component of catalyst reagent 18B—is preheated to a temperature in the range, for example, of about 140° F., in a steam tank 20C that includes a heating jacket 20CA and is pressurized to a pressure in the range of approximate range 20-120 psig, and preferably pressurized to a pressure of between 40-90 psig and more preferably pressurized to a pressure of between 60-80 psig by a pressurization gas 20CB, such as nitrogen ($N_2$). The water 18C is supplied or injected into reaction container 14, via a turbo pump and jet nozzle assembly 16CN at a water inlet port 16C, as super saturated steam and passes through a secondary filter 22B to facilitate saturation of the secondary filter 22B.

Lastly, hydrophobing agent 18D, which comprises, for example, hexamethyldisilazane (HMDZ), is supplied to a hydrophobing inlet port 18D of reaction container 14 from hydrophobing agent tank 20D, which includes a heating jacket 20DA and is pressurized by a pressurizing gas 20DB. Hydrophobic agent 18D is normally heated to temperature of between approximately 90° F. to 185° F., preferably heated to a temperature of between approximately 100° F. to 175° F. and more preferably heated to a temperature of between approximately 130° F. to 140° F. and is pressurized to pressure of between approximately 20-12 psig, or more preferably pressurized to a pressure of between approximately 40-90 psig and most preferably pressurized to a pressure of between approximately 60-80 psig.

The following will first consider the overall operation of the method of the present invention suitable for manufacturing aerogel as illustrated in the CSTR 10 of FIG. 1A, with certain aspects of the operation of the CSTR 10 being considered in further detail in the following discussion.

The reaction container 14 is temperature controlled and includes a laminar flow chamber 14A, a turbulent mixing chamber 14B and a vacuum drying chamber 14C with the various reagents 18 and reaction products being drawn from the laminar flow chamber 14A and through turbulent mixing chamber 14B by a vacuum pump 22C communicating with a vacuum drying chamber 14C. As illustrated in FIG. 1A, the preheated precursor reagent 18A is introduced into the laminar flow chamber 14A of the reaction container 14 as a vapor of atomized aerosol droplets via precursor reagent inlet port 16A and sub-micron precursor nozzle 16AN.

The atomized aerosol droplets of the precursor reagent 18A then flow as a laminar vapor flow to and through catalyst saturated primary catalyst filter 22A and then the water saturated secondary filter 22B, where atomized aerosol droplets of catalyst reagent 18B from catalyst filter 22A and water 18C from secondary filter 22B mix with the atomized aerosol droplets of precursor reagent 18A. The mixture of atomized droplets of the precursor, the catalyst and the water then flows or enters into the turbulent mixing reaction container 14B of reaction container 14, which is the primary site or location for the reactions between the precursor reagent 18A, the catalyst reagent 18B, the water 18C and the hydrophobic agent 18D.

In this regard, it should be noted that the presence of the water 18C, in the form of steam, serves as a conduit to convey the reacting components together, that is, the precursor reagent 18A and the water 18C together with the catalyst reagent18B acting as a reaction accelerant. The presence of water 18C in the turbulent reaction container 14B also inhibits condensation of any of the reagents (e.g., reagents 18A, 18B or 18C) while the turbulent vapors flow into the turbulent reaction container 14B. The turbulent flow, in the turbulent reaction container 14B, is generally maintained at a Reynolds Number in the range of 4000-7000 and this is generally achieved by a vacuum pump 22C communicating with the vacuum drying chamber 14C. Such turbulent flow enhances the mixing of the reagent droplets and thereby allows the hydrolysis-polycondensation reaction to occur on the order of microsecond or milliseconds and thereby enhance the speed and completeness of the reaction.

The hydrolysis-polycondensation reaction resulting from the mixture of atomized aerosol droplets of the precursor reagent 18A, the water 18C and the catalyst reagent18B results in the production of particles of silica gel 16E, along with other reaction by-products, in turbulent reaction container 14B. The presence of silica gel 16E is detected by vibratory sensors 22D provided on a vibratory mesh screen 22E located in the bottom of turbulent reaction container 14B, and hydrophobic agent 18D is introduced into turbulent reaction container 14B, as soon as the silica gel 16E is detected to assist in removing water from the forming silica gel 16E. Also at this time, the silica gel 16E begins to cool and increase in weight and gradually settles and collects on the vibratory mesh screen 22E located at the bottom of turbulent reaction container 14B.

The silica gel particles 16E, which pass through the mesh screen 22E and collect on a silica gel conveyor 22F located below mesh screen 22E, are transported by the conveyor 22F to a hopper 22G located within the vacuum drying chamber 14C, wherein the remaining water and other reaction products are extracted from the silica gel 16E before the silica gel 16E is eventually removed from the reaction container 14.

Considering the flow, the mixing and the interactions of the reagents in reaction container 14 in further detail, it should first be noted that the mixing of the streams of the atomized aerosol droplets of the precursor reagent 18A, the catalyst reagent 18B and the water 18C upon their initial entry into the turbulent mixing chamber 14B depends initially on cross-flow diffusion between the turbulent flows of the streams of the atomized aerosol droplets of the precursor reagent 18A, the catalyst reagent 18B and the water 18C entering the mixing region in turbulent mixing chamber 14B.

It must be further noted that diffusive and convective transport of the atomized aerosol droplets of the precursor reagent 18A, the catalyst reagent 18B and the water 18C occurs within the turbulent mixing chamber 14B, initially through vapor phase diffusion across turbulent flow streams in the lower part of the turbulent mixing chamber 14B. The transport of the $NH_4OH$ and $H_2O$ components, however, occurs at a much higher rate than diffusive transport of the heavier alkoxide molecules because of the alkoxide/$H_2O$ molar mass ratio, which is typically on the order of alkoxide/$H_2O$=17.0.

Considering the flow of the reagents 18A, 18B and 18C through the reaction container 14 in further detail, the stream of the atomized aerosol droplets of precursor reagent diffuse or convect to either a stagnant surrounding region or into the reaction zone, that is, toward the reaction region in the turbulent reaction container 14B. The stream of atomized aerosol droplets of the catalyst reagent 18B, in turn, is surrounded by two turbulent flow zones and is not subjected to significant convective flow upon initial entering into the reaction zone in the turbulent reaction container 14B, while the stream of the atomized aerosol droplets of the water 18C is surrounded, on all sides, by the lateral reaction zone.

Next considering the formation of atomized aerosol droplets of the reagents 18A, 18B and 18C and the subsequent formation of the droplets or the particles silica gel 16E in the reaction container 14, it must first be noted that the precursor reagent 18A, the catalyst reagent 18B and the water 18C are all injected into the reaction container 14 in the form of streams of high dew point vapors. High dew point vapors, upon cooling of the vapors, eventually condense into aerosol droplets and this occurs initially, or begins, for the precursor reagent 18A vapors during the laminar flow of the precursor reagent 18A and as the precursor reagent 18A flows across the laminar flow chamber 14A. The cooling and droplet formation processes continue through the turbulent reaction container 14B, however, with the turbulent stream of the atomized aerosol droplets of the precursor reagent 18A and the catalyst reagent 18B and the water 18C vapors cooling, due to contact with the surrounding air, to a temperature of about 120° F., thereby creating a cooling gradient across the turbulent reaction container 14B.

In this regard, it should be noted that the vapors of the precursor reagent 18A stream most readily serve as nuclei for the aerosol formation from others of the reagents 18 when the precursor reagent 18A vapors, include the water or alcohol vapors, hence the consideration of the water 18C as a catalytic component. It should also be noted, however, that the precursor reagent 18A vapors, whether or not they include any water or alcohol, will not serve as nuclei for the formation of catalyst reagent 18B aerosol droplets from the vapors because the catalyst reagent 18B comprises ammonia which is a gas at a negative pressure and temperature within reaction container 14.

Instead, it is expected that the catalyst reagent 18B (ammonia) vapors will first condense when the precursor reagent 18A stream is in the form of the atomized aerosol droplets, and will then serve as nucleation sites for the water 18C vapor. In this regard, it should be noted that while ammonia is miscible with water, and can thus serve as nucleation sites for the water, ammonia is only marginally miscible with TEOS, for example. When the alkoxy stream is in aerosol form, it is expected that the ammonia stream will first condense and serve as nucleation site for the water. Ammonia is miscible with water, but only marginally miscible with TEOS. Because of this, changing pH of the reactants occurs at a later stage in reactor configurations.

As the vapors proceed into the mixing/reaction zone and begin to condense, the condensation reaction forms extremely small nascent oxide particles, e.g., on the order of about 1 to 5 on the nanometer scale. Further downstream, growth of the sol gel continues in an environment where convection becomes more important and the effects of the turbulent flow become smeared or disrupted by combined cross-flow diffusion and convective turbulence of the entering reactant stream(s).

As noted above, the alkoxide stream comprises high molar mass molecules with low transport coefficients. Water and ammonia have comparable transport coefficients and are primarily responsible for the cross-flow diffusion.

The molar concentration of the water and the alkoxide vapor, fed to the laminar flow chamber, varies with the temperature of the reactant bubblers. A stoichiometric mixture would involve an $H_2O$/alkoxide ratio of 4 to 1, and it has been observed that in order to reproducibly produce powder, the feed rate of the water must be significantly above this stoichiometric level as is the case for all of the reactions.

The hydrolysis/condensation reaction produces ethanol as a byproduct. The vapor pressure of ethanol is 60 mm Hg at 78.8° F. and ethanol has a boiling point of 78.4° C., so that the room temperature vapor pressure in the CSTR 10 is sufficient for rapid removal of the ethanol byproduct if the reactants are mixed sufficiently well in the mixing zone. Since water 18C is present in the mixing zone either at, or close, to its saturated vapor pressure, the removal of excess water from the product may not be favorable and some hydrated silica may result as a reaction by-product. In addition, some post-aggregation hydrolysis may result in the CSTR 10 in order to fully hydrolyze the alkoxide. That is, for partially hydrolyzed alkoxide under limited ammonia conditions, aggregates may form from the partially hydrolyzed alkoxide, and the aggregates will age in the presence of the excess water and some ammonia to form fully hydrolyzed alkoxide.

A. Precursor Reaction Mechanism

Next considering certain of the reaction mechanisms involved in the process of the present invention, TEOS is tetra-ethyl-ortho-silicate, or equivalently tetra-ethoxy-silane, and is illustrated below:

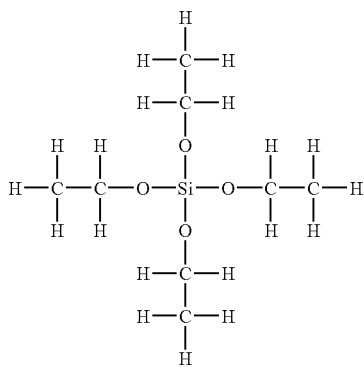

TEOS is a liquid at room temperature with a vapor pressure of about 1.5 Torr (0.03 psi). TEOS slowly hydrolyzes into silicon dioxide and ethanol when in contact with ambient moisture, but its flammability and toxicity are similar to that of an alcohol.

The vapor for use in the present process is generated by a bubbler or by a liquid injection system. In either case, an elevated temperature, above room temperature, is normally utilized to increase the partial pressure of TEOS, thus it becomes necessary to heat the gas lines to prevent condensation therein. If a bubbler is used, it is necessary to ensure that the carrier gas is essentially free of any moisture, otherwise the slow accumulation of polymerized products in the TEOS reservoir will cause a decrease in the vapor pressure and drift of the process characteristics.

For low chamber pressure (<10 Torr≈0.20 psi), the vapor over warm TEOS liquid can be metered directly through a heated low pressure mass-flow controller.

The key to understanding the difference between TEOS and silane is to note that for TEOS the silicon atom is already oxidized and that the conversion of TEOS into silicon dioxide is thereby essentially a rearrangement rather than an oxidation reaction with much reduced changes in free enthalpy and free energy.

B. Silica Aerogel Formation Process

The basic overall reaction for the formation of silicon dioxide requires the removal of two oxygen atoms, as illustrated below.

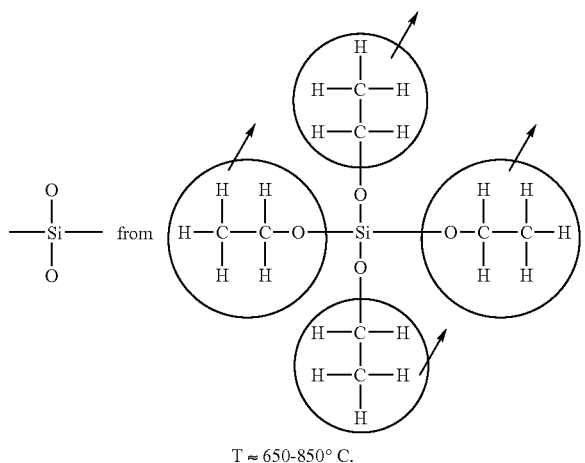

T ≈ 650-850° C.

While gas phase reactions can occur, particularly at the high end of the temperature range, silica aerogel formation is the result of TEOS surface reactions. The TEOS chemisorbs onto the silanol groups (Si—OH) at the surface, as well as strained surface bonds, as illustrated below.

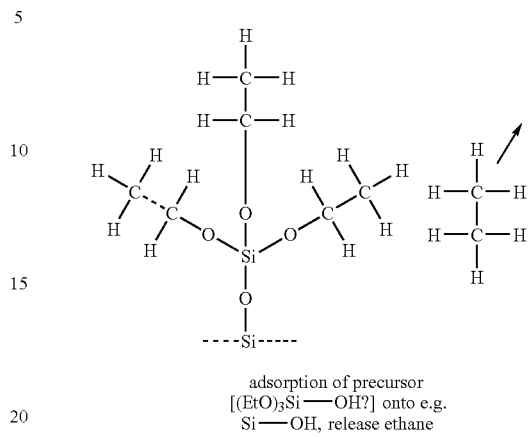

adsorption of precursor
[(EtO)$_3$Si——OH?] onto e.g.
Si——OH, release ethane

TEOS will not absorb onto the resulting alkyl-covered surface, so aerogel formation is limited by removal of the surface alkyl groups. These groups can undergo elimination reactions with neighboring molecules to form Si—O—Si bridges, as illustrated below.

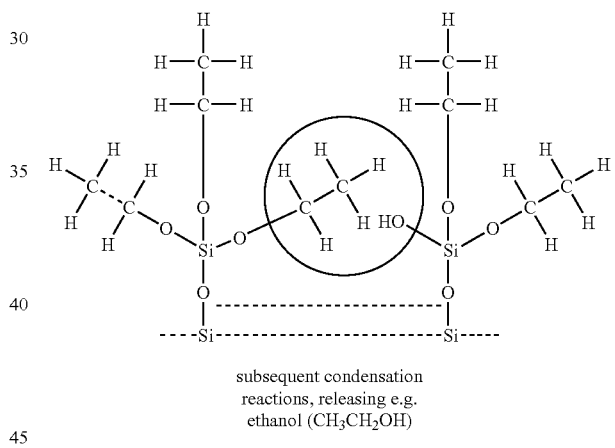

subsequent condensation
reactions, releasing e.g.
ethanol (CH$_3$CH$_2$OH)

This process proceeds in an inert atmosphere as TEOS can be its own oxygen source and SiO$_2$ can be formed from the TEOS in nitrogen. However, the addition of oxygen increases the deposition rate, presumably through providing an alternative path for removal of the ethyl groups from the surface.

TEOS is a relatively inexpensive and a safe source of silicon dioxide, but the reaction of TEOS, using oxygen or inert ambient, components, normally requires a temperature in excess of 600° C. and the TEOS/O$_2$ reaction is generally performed in a tube reactor, for example, at pressures of the few Torr or so.

It is necessary to add a more aggressive oxidant in order to achieve lower process temperatures. For this reason, the process of the present invention employs triatomic oxygen, that is, ozone (O$_3$), which is metastable at room temperature and slowly degrades into a molecular oxygen (O$_2$) over a few days. The ozone decomposition reaction generates monatomic oxygen O intermediates, is strongly activated and, at temperature >200° C., takes place over a millisecond.

An ozone in concentration greater than about 12-15 mole % is explosive, even at room temperature, thus limiting most applications of ozone to maximum concentration of less than 10 mole %, and ozone is normally generated from oxygen at the point of use since ozone cannot be readily stored for a long period of time. The process of the present invention therefore uses a "silent discharge" generator cell, that is, an RF capacitive discharge at atmospheric pressure through a dielectric wall. Efficient generation of ozone normally requires generous cooling provisions to keep the cell temperature low and avoid decomposition of the ozone as soon as the same is produced. It should also be noted that a trace amount of nitrogen is sometimes added to help catalyze the formation of ozone and stabilize the generator output, but that the addition of nitrogen may generate nitric oxides which could lead to corrosion of metal plumbing and may possibly contaminate the reactor.

It should further be noted that ozone is highly toxic but also has excellent warning properties, such as a distinctive smell when at a concentration well below toxic levels. Toxic monitoring and handling in organic-free plumbing are essential because ozone will attack most sealing materials (O-rings) upon prolonged exposure of such sealing materials to ozone. Ozone dissolves in water, but does not immediately decompose so a simple water scrubbing of the exhaust fumes is not adequate for treatment, but burning or a catalysis are helpful in removing any residual ozone.

Figure 5:
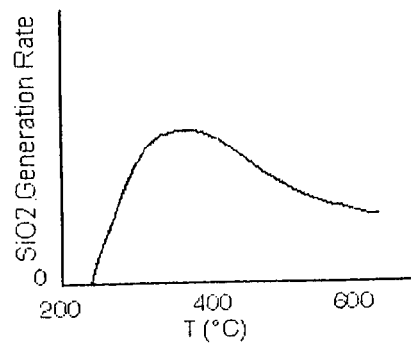
FIG. 5 is a graph showing $SiO_2$ generation rate versus temperature.
Figure 6:
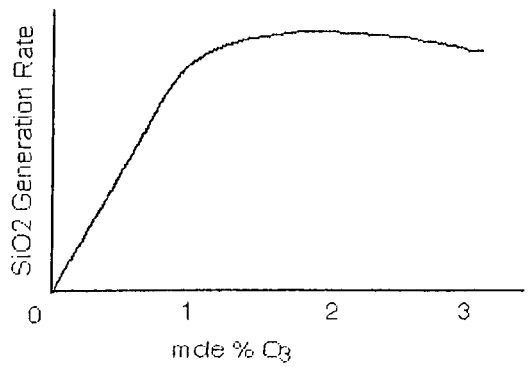
FIG. 6 is a graph showing $SiO_2$ generation rate versus ozone.

The effects of the addition of a few mole of ozone to oxygen to obtain silicon dioxide granules at much lower temperatures than with oxygen alone are illustrated in FIG. 4. As illustrated therein, the granule generation rate begin to accelerate as the concentration of ozone is increased, although granule quality was determined to improve by using ozone concentrations well in excess of the "knee" of the curve illustrated in FIG. 5.

C. Silica Aerosol Process

The mechanism of the silica aerosol generation process of the present invention involves the attack of monatomic oxygen produced in the heated reagent gases gas on TEOS, both at the surface and in the gas phase. Gas phase reactions have been shown to represent a significant influence for aerogel granule formation under sub-atmospheric (vacuum) conditions. Typical reactions involve the attack of the alkyl group with, e.g., Si—OH left behind, and such reaction is diagrammatically illustrated below.

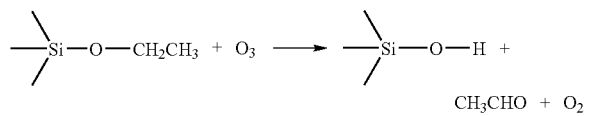

D. Granule Quality—Moisture, Stress and Friability

TEOS/ozone films, like TEOS/$O_3$ films, have excellent conformality and in some cases seem to display a "flow-like" or more-than-conformal behavior, filling re-entrant features that could not be filled by merely uniform deposition over the existing topography. However, this desirable behavior comes at a price and the following discusses some of the problems encountered in development of the process of the present invention.

For example, while initial work on the processes of the present invention was performed at pressures on the order of 1-10 Torr, it was found that the granule quality is much improved by adopting higher pressure reaction conditions.

Figure 7:
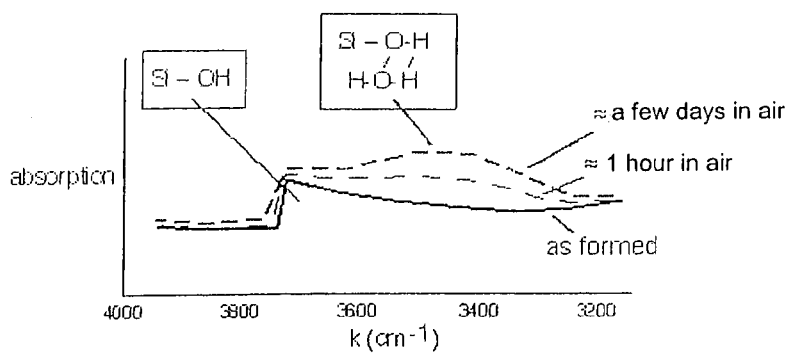
FIG. 7 is a graph showing Si—OH absorption.

In further example, silicon dioxide is amorphous and cannot be characterized by classic crystallographic (x-ray diffraction) techniques. However, infrared spectroscopy is extremely useful and the nature and quantity of bonds in the material can be detected quickly and non-destructively. A slice of a typical IR spectrum of silicon dioxide from TEOS and ozone is illustrated in FIG. 7.

The infrared spectrum in the illustrated region is mostly sensitive to vibrations of hydrogen atoms which, due to their low mass, have high characteristic frequencies. In the illustrated frequency band formed granules reveal characteristic saw-tooth absorption, which is assigned to silanol (Si—OH) groups. These are hydrogen-bonded to various extents to nearby silanols. The left edge of the saw-tooth is near the frequency of the O—H vibration of a truly isolated silanol group, around 3750/cm. Exposure to air and re-measurement will show the growth of a more symmetrical broad absorption, centered around 3300/cm. This absorption is assigned to the water molecules which are hydrogen-bonded to the silanol groups. The extent of this symmetric absorption is essentially an indicator of the amount of water absorbed by the granules.

Figure 8:
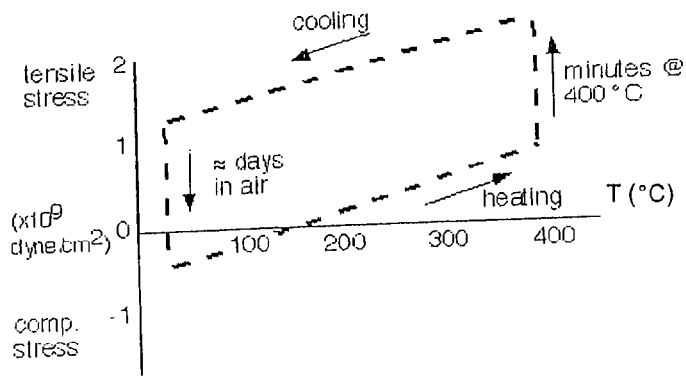
FIG. 8 is a diagrammatic illustration of silica tensile stress through temperature cycling.

Absorption of water, found in the IR spectrum, is also indicated in the granule stress, typically measured by the change in the curvature of the granule circumference. A typical result for stress during a thermal cycle is illustrated in FIG. 8.

The granules are under modest tensile stress as they are formed, but if the measurement of stress is not performed quickly, apparent compressive stress will be measured as water is absorbed into the film over the course of a few hours, unless of course treated with a hydrophobic agent such as HMDZ. In the case of untreated granules and upon heating, the water is driven off with a consequent increase in tensile stress superimposed upon the tensile stress resulting from differential thermal expansion of various silicon dioxide granules. If the granule is heated to a maximum temperature of up to about 400° C., the stress upon cooling will be more tensile than it was initially and, over the course of several days, will slowly relax back to its initial compressive stress. This is the phenomenon of stress hysteresis.

Stress hysteresis and IR absorption both signal the presence of water molecules in the granules. It is likely that the underlying cause of the increased susceptibility of TEOS/ozone granules to silanol incorporation is the large size of the TEOS molecule. Granules produced from TEOS must undergo significant restructuring to form dense silicon dioxide, as the "holes" left behind by the elimination of ethane or ethoxy groups are filled. This restructuring becomes difficult if the adsorbed molecule is "under" the surface, covered by subsequent granules. Thus higher granule formation rates, which are desirable to reduce cost, generally result in poorer granule quality.

This problem is a result of either no bridge bonds being made, which results in porous granules, or if the bonds are made, such bonds are strained so that the bonds are susceptible to later hydrolysis. Silane chemistry only requires the elimination of small hydrogen molecules, or perhaps water molecules, and does not lead to as much porosity, and Si—H bonds incorporated into the granules may also act as an "internal getter" for any residual moisture. In addition, high temperature TEOS formation allows the bonds to stretch and readjust, during granule generation, and again produces a denser and purer granule. This process is illustrated by the following experimental examples:

EXAMPLE 1

Weight of TEOS=5 g
Flow Rate of TEOS=5.0 cc/min
Weight of Ammonia=3 g
Flow Rate of ammonia=0.3 cc/min
Weight of $H_2O$=15 g
Flow Rate of Steam=23 cc/min
Weight of HMDZ=0.35 g
Flow Rate of HMDZ=0.02 cc/min

EXAMPLE 2

Weight of TEOS=5 g
Flow Rate of TEOS=5.0 cc/min
Weight of Ammonia=0.5 g
Flow Rate of ammonia=0.1 cc/min
Weight of $H_2O$=15 g
Flow Rate of Steam=23 cc/min
Weight of HMDZ=0.15 g
Flow Rate of HMDZ=0.007 cc/min

EXAMPLE 3

Weight of TEOS=5 g
Flow Rate of TEOS=5.0 cc/min
Weight of Ammonia=3 g
Flow Rate of ammonia=0.3 cc/min
Weight of $H_2O$=10 g
Flow Rate of Steam=11 cc/min
Weight of HMDZ=0.15 g
Flow Rate of HMDZ=0.007 cc/min

EXAMPLE 4

Weight of TEOS=5 g
Flow Rate of TEOS=5.0 cc/min
Weight of Ammonia=3 g
Flow Rate of ammonia=0.3 cc/min
Weight of $H_2O$=15 g
Flow Rate of Steam=23 cc/min
Weight of HMDZ=0.35 g
Flow Rate of HMDZ=0.02 cc/min

EXAMPLE 5

Weight of TEOS=5 g
Flow Rate of TEOS=5.0 cc/min
Weight of Ammonia=3 g
Flow Rate of ammonia=0.3 cc/min
Weight of $H_2O$=15 g
Flow Rate of Steam=23 cc/min

EXAMPLE 6

Weight of TEOS=5 g
Flow Rate of TEOS=5.0 cc/min
Weight of Ammonia=3 g
Flow Rate of ammonia=0.3 cc/min
Weight of $H_2O$=15 g
Flow Rate of Steam=23 cc/min
Weight of EAcAc=0.35 g
Flow Rate of EAcAc=0.02 cc/min Since certain changes may be made in the above described improved aerogel, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A kinetically controlled vapor reaction process, for synthesizing silica areogel, comprising the steps of:
   in a reaction container,
   continuously injecting a precursor reagent vapor including an ethanol and an alkoxide at an initial precursor reagent temperature between 90° F. and 185° F. and at an initial precursor reagent pressure of 20 to 120 psig,
   continuously injecting a catalyst reagent vapor of ethanol/ammonium hydroxide at an initial catalyst reagent temperature between 90° F. and 185° F. and at an initial catalyst reagent pressure of 20 to 120 psig,
   continuously injecting super saturated steam as a component of the catalyst reagent,
   continuously injecting a hydrophobic reagent vapor at an initial hydrophobic reagent temperature between 90° F. and 185° F. and at an initial hydrophobic reagent pressure of 20 to 120 psig, and
   continuously mixing vapor droplets of the precursor and the catalyst reagents in a super saturated state and under turbulent flow conditions in the reaction container, whereby
   the precursor and the catalyst reagents continuously nucleate in a hydrolysis/poly-condensation reaction and deposit as silica aerogel.

2. The process for synthesizing silica areogel of claim 1, further comprising the step of maintaining an internal temperature of the reaction container at a reaction container temperature between 90° F. and 185° F. and an internal pressure of the reaction container at a negative reaction container pressure of 5 to 28 psig.

3. The process for synthesizing silica areogel of claim 2, further comprising the step of obtaining the silica aerogel having a density in a range of about 0.030-0.110 g/cc, an R-value in a range of about 20-50 and a controlled particle size distribution in a range of about 1.0-5.0 mm.

4. The process for synthesizing silica areogel of claim 1, further comprising the step of injecting the precursor reagent at a temperature of between 100° F. and 140° F. and at a pressure of between 40 to 90 psig.

5. The process for synthesizing silica areogel of claim 1, further comprising the step of injecting the precursor reagent at a temperature of between 100° F. and 140° F. and at a pressure of between 60 to 80 psig.

6. The process for synthesizing silica areogel of claim 1, further comprising the step of injecting the catalyst reagent at a temperature of between 100° F. and 155° F. and at a pressure of between 40 and 90 psig.

7. The process for synthesizing silica areogel of claim 1, further comprising the step of injecting the catalyst reagent at a temperature of between 110° F. and 140° F. and at a pressure of between 60 and 80 psig.

8. The process for synthesizing silica areogel of claim 1, further comprising the step of injecting the hydrophobic reagent at a temperature of between 100° F. and 175° F. and at a pressure of between 40 and 90 psig.

9. The process for synthesizing silica areogel of claim 1, further comprising the step of injecting the hydrophobic reagent at a temperature of between 130° F. and 160° F. and at a pressure of between 60 and 80 psig.

10. The process for synthesizing silica areogel of claim 1, further comprising the step of maintaining an internal temperature of the reaction container between 110° F. and 160° F.

11. The process for synthesizing silica areogel of claim 1, further comprising the step of maintaining an internal temperature of the reaction container between 130° F. and 140° F.

12. The process for synthesizing silica areogel of claim 1, further comprising the step of maintaining an internal temperature of the reaction container between 110° F. and 160° F. and at a negative internal pressure between 10 and 25 psig.

13. The process for synthesizing silica areogel of claim 1, further comprising the step of maintaining the reaction container at a negative internal pressure between 15 and 20 psig.

14. The process for synthesizing silica areogel of claim 1, further comprising the step of using at least one of partially hydrated tetraethoxysilane and partially hydrated tetramethylorthosilicate as the alkoxide.

15. The process for synthesizing silica areogel of claim 1, further comprising the step of using at least one of ammonium hydroxide/200 proof USP grade ethanol and gamma-APTES/200 proof USP grade ethanol as the catalyst reagent.

16. The process for synthesizing silica areogel of claim 1, further comprising the step of injecting the precursor reagent into the reaction chamber via a turbo pump and a jet nozzle at a location where a vapor flow stream commences flow through the reaction container.

17. The process for synthesizing silica areogel of claim 1, further comprising the step of injecting the catalyst reagent vapor into the reaction container via a turbo pump and a jet nozzle and into a catalyst filter located in a vapor flow stream through the reaction container after an injection point of the precursor reagent vapor.

18. The process for synthesizing silica areogel of claim 1, further comprising the step of injecting the super saturated steam into the reaction container through a turbo pump and a jet nozzle and into a secondary filter located in a vapor flow stream through the reaction container after injection point of the precursor reagent vapor and the catalyst reagent vapor.

19. The process for synthesizing silica areogel of claim 1, further comprising the step of obtaining the silica aerogel having a particle size in the range of between about 5-25 nanometers as a reaction byproduct.

20. The process for synthesizing silica areogel of claim 1, further comprising the step of obtaining the silica aerogel having a surface area in the range of 600-800 $m^2/g$.

21. The process for synthesizing silica areogel of claim 1, further comprising the step of obtaining the silica aerogel having a percent light transmission in the range of between about 20%-25%.

22. The process for synthesizing silica areogel of claim 1, further comprising the step of obtaining the silica aerogel having a density in a range of about 0.030-0.110 g/cc, an R-value in a range of about 20-50 and a controlled particle size distribution in a range of about 1.0-5.0 mm.

23. The process for synthesizing silica areogel of claim 1, further comprising the step of obtaining the silica aerogel having a controlled particle size distribution in a range of about 2.0-4.0 mm.

* * * * *